United States Patent [19]

Tsuchiya et al.

[11] 4,360,622

[45] Nov. 23, 1982

[54] HOT MELT ADHESIVE COMPOSITIONS COMPRISING HYDROGENATED RESIN AND ETHYLENE-POLAR VINYLIC COMPOUND COPOLYMER OR WAX

[75] Inventors: Shozo Tsuchiya, Tokyo; Akio Oshima; Hideo Hayshi, both of Yokohama, all of Japan

[73] Assignee: Nippon Oil Co., Ltd., Tokyo, Japan

[21] Appl. No.: 243,398

[22] Filed: Mar. 13, 1981

[30] Foreign Application Priority Data

Mar. 26, 1980 [JP] Japan .................................. 55/37541

[51] Int. Cl.³ ....................... C08L 91/08; C08L 23/08
[52] U.S. Cl. ................................... 524/275; 428/462; 524/277; 524/518; 524/524; 524/525; 525/210; 525/211; 525/216; 525/940
[58] Field of Search ................. 260/28.5 AV, 28.5 B; 525/940, 210, 211, 216; 524/275, 277, 524, 528

[56] References Cited

U.S. PATENT DOCUMENTS 3,084,147  4/1963  Wilks ................................ 260/23 X
3,926,878  12/1975  Shimizu et al. .............. 260/28.5 AV Primary Examiner—Theodore E. Pertilla
Attorney, Agent, or Firm—Jordan and Hamburg

[57] ABSTRACT

A hot melt adhesive composition comprising (I) a hydrogenated resin having a softening point of 60°–130° C. obtained by the hydrogenation of a copolymer resin prepared by reacting (A) at least one five-membered cyclic compound such as cyclopentadiene with (B) at least one dimer or trimer of the five-membered cyclic compound, isoprene and piperylene in specified ratios by weight, and (II) an ethylene type copolymer and/or wax.

11 Claims, No Drawings

HOT MELT ADHESIVE COMPOSITIONS COMPRISING HYDROGENATED RESIN AND ETHYLENE-POLAR VINYLIC COMPOUND COPOLYMER OR WAX

This invention relates to a novel hot melt adhesive composition.

Hot melt adhesive compositions are solid at ambient temperature, melted by heating when used, coated on various substrates and then cooled to solidify. Thus, they find a wide use as an adhesive, coating material or the like for such substrates.

At the present, conventional hot melt adhesive compositions comprise as the base polymer an ethylene type copolymer such as an ethylene-vinyl acetate copolymer (EVA) or ethylene-acrylate copolymer, or a thermoplastic polymer such as polyethylene, polyamide, polyurethane or polyester and further comprise various waxes as the viscosity adjuster and tack providing resins.

As the tack providing resins, there have been widely used natural resins such as rosin and rosin esters with the rosin esters being preferred because of their excellent tack providing capability. Since, however, these resins are obtained from natural resources and are uncertain as to their cost and supply, petroleum resins obtainable from abundant petroleum resources tend to be substituted for the rosin esters.

On the other hand, the petroleum resins are disadvantageous in that they have poor tack-providing capability, unsatisfactory heat resistance, undesirable odor and the like. There have thus been proposed various means for attempting to eliminate these disadvantages, however, satisfactory means are not obtained as yet. Such resins as those obtained by hydrogenating aromatic type petroleum resins or cyclopentadiene type resins are widely used, while they are very low in tack providing capability (such as peel strength).

U.S. Pat. No. 3,084,147, for example, discloses that dicyclopentadiene of high purity is polymerized at a temperature in the range of 260°–290° C. to obtain a light-colored resin. Such a resin is not satisfactory in heat stability and bond strength for use as a tack providing resin for hot melt adhesives. As an improved form of this resin, Japanese Pat. Appln. Laid-Open No. 51-83688 discloses that 40–90 wt.% of dicyclopentadiene or its alkyl-substituted derivative and 10–60 wt.% of a co-dimer of cyclopentadiene or its alkyl-substituted derivative and isoprene or piperylene are copolymerized under heat to obtain a resin which is excellent in heat stability and compatibility with rubber or plastics. The Japanese No. 51-83688 also discloses that a resin prepared by hydrofining the thus obtained resin has also the same excellent properties as the original resin. However, these improved resins are still unsatisfactory in adhesiveness for use as a tack providing resin for hot melt adhesives.

In an attempt to obtain resins eliminating these drawbacks and having very high tack-providing capability, they made intensive studies and succeeded in the development of a process for producing resins having very high tack-providing capability. They found that a hot melt adhesive composition having excellent adhesiveness may be prepared by incorporating a predetermined amount of the thus produced resin in a base polymer, thus accomplishing this invention.

A primary object of this invention is to provide a hot melt adhesive composition having excellent adhesiveness. This object may be achieved by producing a hot melt adhesive composition comprising, as the essential components, (I) a hydrogenated resin (2) having a softening point of 60°–130° C. prepared by hydrogenating a copolymer resin (1) obtained by copolymerizing 20–38 parts by weight of at least one ingredient (A) selected from the group consisting of five-membered cyclic compounds having conjugated double bonds and the Diels-Alder's adducts thereof, the five-membered cyclic compounds being represented by the following general formula

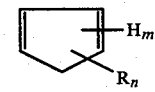

wherein H is hydrogen, R is an alkyl group having 1–3 carbon atoms, m and n are each zero or an integer of at least 1 with the proviso that the total of m and n is 6, with 80–62 parts by weight of at least one ingredient (B) selected from the group consisting of homodimers, homotrimers, codimers and cotrimers of at least one diene (excluding such dimers and trimers covered by the ingredient (A)) selected from said five-membered cyclic compound, isoprene and piperylene and (II) an ethylene type copolymer and/or wax.

The hot melt compositions of this invention will be explained hereinbelow in more detail.

The hydrogenated resin (2) (component (I)) is obtained by copolymerizing the ingredient (A) with the ingredient (B) to obtain a copolymer (1) and then hydrogenating and thus obtained copolymer (1). The resin (2) has a softening point of 60°–130° C.

The ingredient (A) is at least one member selected from the group consisting of five-membered cyclic compounds having conjugated double bonds represented by the following general formula

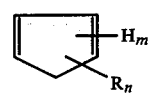

wherein H, R, m and n are as defined above, and the Diels-Alder's adduct of said five-membered cyclic compounds.

The five-membered cyclic compounds used herein include cyclopentadiene, methylcyclopentadiene and the like, and the Diels-Alder's adducts thereof include dicyclopentadiene, a cyclopentadiene-methylcyclopentadiene codimer, tricyclopentadiene and the like. These compounds may industrially be used alone or in combination with cyclopentadiene, dicyclopentadiene and mixtures thereof being particularly preferable.

The ingredient (A) may be incorporated with the unsaturated components of petroleum fractions, particularly the unsaturated aromatic components thereof, in an amount which is equal to or less than that of the original ingredient (A). Said unsaturated components include, for example, styrene, α-methylstyrene, vinyltoluene, isopropenyltoluene, indene, methylindene and mixtures thereof; for industrial use, they may preferably be a C$_9$ fraction.

The ingredient (B) is at least one member selected from the group consisting of dimers and trimers, excluding those covered by the ingredient (A), of a diene selected from the conjugated double bonds-containing five-membered cyclic compounds of said general formula, isoprene and piperylene. More particularly, the ingredient (B) is a homo- or co-dimer, or homo- or co-trimers of the aforesaid three kinds of dienes (excluding dicyclopentadiene and the like covered by the ingredient (A)). Typical of these homodimers, codimers, homotrimers and cotrimers are homodimer, homotrimer, codimer and cotrimers of isoprene and piperylene; codimer and cotrimers of isoprene and cyclopentadiene; codimer and cotrimers of piperylene and cyclopentadiene; cotrimer of isoprene, piperylene and cyclopentadiene; and mixtures thereof.

The ingredient (B) may be obtained by heating either at least one of isoprene and piperylene or a mixture of these compounds with a five-membered cyclic compound such as cyclopentadiene in the presence or absence of an inert solvent, or it may also be obtained by heating a so-called C$_5$ fraction contained in a distillate containing the aforesaid monomers, the distillate being obtained by the thermocracking of petroleum. The heating in these two cases is effected at a temperature of usually 100°–300° C., preferably 150°–230° C. The reaction which takes place at this temperature, is mainly a Diels-Alder's reaction of these monomers. After the end of the reaction, it is possible to distil off the unreacted portion of the fraction thereby obtaining a fraction boiling at 80° C. or higher; in this case, it is desirable that the thus obtained fraction be freed of tetramers and higher polymers. However, this fraction as obtained may be used as the ingredient (B) if it contains such tetramers and higher polymers in a small amount.

In the practice of the aforementioned copolymerizing reaction according to this invention, the starting monomers must be used in specified respective amounts. More particularly, it is necessary to use the ingredients (A) and (B) in amounts by weight of 20–38, preferably 30–35 parts, and 80–62, preferably 70–65 parts, respectively. The use of the ingredient (B) in an amount by weight of more than 80 parts will undesirably result in the production of a copolymer resin having an unduly low softening point in a low yield, while the use thereof in an amount by weight of less than 62 parts will also undesirably result in the production of a copolymer resin having a molecular weight varying in a wide range, this copolymer resin being hydrogenated to produce a hydrogenated one which is unsatisfactory in adhesiveness for use as a tack providing resin for hot melt adhesives.

It is important in this invention to use as the starting material a mixture of the ingredients (A) and (B) in the specified mixing ratios as is seen from the above. Such a mixture may be prepared for example by subjecting so-called C$_5$ and C$_6$ fractions in an oil obtained as a by-product by the high-temperature thermocracking of naphtha and the like, to heat treatment as mentioned above thereby to convert the cyclopentadiene, methylcyclopentadiene, isoprene, piperylene and the like contained in the fractions to their homodimers, homotrimers, codimers and cotrimers in mixture and then distilling off the greater part of the unreacted ingredients such as C$_5$ olefins and C$_5$ paraffins so as to obtain a concentrated fraction containing the ingredients (A) and (B) in a ratio by weight of 20–38:80–62 for use as the mixed starting material for the copolymer resin (1).

The copolymer resin (1) may be obtained by copolymerizing the aforesaid polymerizable monomers in the aforesaid ratios in the presence or absence of a catalyst. In a case where the copolymerization is effected in the absence of a catalyst, the specified mixture of the ingredients (A) and (B) may be heated to 200°–330° C. for 30 minutes to 15 hours, preferably 1–7 hours, to obtain a copolymer resin (1), while in a case where a catalyst is used in the copolymerizing reaction, the reaction may be effected at −30° to 100° C., preferably 0° to 50° C., for 10 minutes to 20 hours, preferably 1–15 hours. The catalyst used in the latter case includes Friedel-Crafts type catalysts such as boron trifluoride, its phenol, ether or acetic acid complex and aluminum chloride. The catalyst may be used in an amount by weight of 0.1–10%, preferably 0.3–3%, per the total amount by weight of the monomers used.

In the copolymerizing reaction according to this invention, it is not essential to use a solvent and, nevertheless, it is desirable to effect the reaction in the presence of a solvent in order to facilitate the control of the reaction. The solvents used herein include various inert hydrocarbon solvents typical of which are pentane, hexane, heptane, benzene, toluene, xylene, cyclohexane, methylcyclohexane and dimethylcyclohexane.

The copolymer resin (1) may be hydrogenated by a conventional known method used in hydrogenating ordinary petroleum resins and cyclopentadiene type resins. In the hydrogenating reaction, either a polymer oil from which the copolymer resin (1) is to be obtained, or the copolymer resin (1) itself may be used. The hydrogenation will be detailed hereinbelow.

The copolymer resin (1) for example is dissolved in a hydrocarbon solvent such as hexane, heptane, octane, cyclohexane, methylcyclohexane, decalin, benzene, toluene or xylene and then heated to 0°–350° C., preferably 150°–260° C., at a hydrogen pressure of from atmospheric to 200 Kg/cm$^2$·G in the presence of at least one active metal, whether carried or not carried on a solid carrier such as alumina, silica alumina or diatomaceous earth, selected from the group consisting of Group 8 metals (in Periodic Table) such as nickel, palladium, ruthenium, rhodium, cobalt and platinum, Group 6 metals such as tungsten, chromium and molybdenum, Group 7 metals such as rhenium and manganese, and copper or the like, thereby to obtain the hydrogenated copolymer resin (2) which may be used in the preparation of the hot melt adhesive compositions of this invention.

In this invention it is required that the hydrogenated copolymer resin (2) have a softening point of 60°–130° C., preferably 80°–110° C. If such a resin having a softening point lower than said range is used in the preparation of a hot melt adhesive composition then the resulting adhesive composition will exhibit unsatisfactory adhesiveness when used since it decreases in cohesive force, while if such a resin having a softening point exceeding said range is used, the resulting adhesive composition will exhibit decreased adhesiveness when used since the resin itself decreases in tack providing effect, these two cases being thus undesirable.

The component (II) used in this invention is at least one member selected from the group consisting of ethylene type copolymers and waxes. The ethylene type copolymers are a copolymer of ethylene and a polar vinylic compound and typically illustrated by copolymers of ethylene and vinyl acetate, an acrylic ester or methacrylic ester. The ethylene type copolymers containing 5–25 mol% of a polar vinylic compound may usually be used. In addition, the waxes used herein include petroleum waxes such as paraffin wax and microcrystalline wax, natural wax, and synthetic waxes such as polyethylene wax, polypropylene wax, Fischer-Tropsch wax and oxidized wax.

The hot melt adhesive compositions of this invention are prepared by mixing the hydrogenated resin (2) as the tack providing resin with the ethylene type copolymer and/or wax as the base material. The resin (2) and the base material (copolymer and/or wax) may be mixed with each other in a wide ratio. In general, 20–300 parts by weight of the hydrogenated resin (2) may be blended with 10–400 parts by weight of the wax and/or 100 parts by weight of the ethylene type copolymer. If necessary, the hot melt adhesive composition may be incorporated with 0–5 parts by weight of rosin, its derivative, terpene resin, aromatic petroleum resin, other tack providing resins, calcium carbonate, titanium oxide, talc, clay and/or other fillers, 0–5 parts by weight of an antioxidant, 0–20 parts by weight of a plasticizer, 0–20 parts by weight of a pigment, and the like. In a case where the resulting hot melt adhesive composition is to be used as an adhesive for paper, plastic films, aluminum foils or packaging materials, it should preferably contain the ethylene type copolymer in a comparatively small proportion; on the other hand, in a case where the resulting composition is to be used for wood working and bookbinding which require comparatively high bond strength, it should preferably contain the ethylene type copolymer in a comparatively large proportion or the ethylene type copolymer and hydrogenated resin (2) in a major proportion.

This invention will be better understood by the following Syntheses and Examples to which it is not limited as far as it does not depart from the spirit thereof. All the parts in the Synthesis and Examples are by weight unless otherwise specified. In the Examples, softening points, colors and bromine values were determined in accordance with the following methods:

Softening point: JIS K-2531-60 (ring and ball method)
Color: ASTM D-1544-58 T (Gardner color)
Bromine value: JIS K-2543-65

SYNTHESIS EXAMPLES 1–6

(Preparation of resins for use in Examples)

Preparation of copolymer resin (1)

In each of the Synthesis Examples 1–6 the starting materials shown in Table 1 were charged into a 2-liter autoclave, reacted together in a nitrogen atmosphere under the polymerizing conditions shown in Table 1 to obtain a polymer solution and then distilling off the unreacted starting materials, low-grade polymers and xylene from the thus obtained polymer solution, thus obtaining copolymer resins (1)-1, (1)-2, (1)-3, (1)-4, (1)-5 and (1)-6.

COMPARATIVE SYNTHESIS EXAMPLE 1

Three hundred (300) parts of dicyclopentadiene and 700 parts of xylene were charged into a 2-liter autoclave, reacted at 260° C. for 2 hours in a nitrogen atmosphere to obtain a polymer solution and then removing the unreacted material, low-grade polymers and xylene from the thus obtained polymer solution by the distillation thereof thereby to obtain a resin (3)-1. The properties of the thus obtained resin are as indicated in Table 1.

COMPARATIVE SYNTHESIS EXAMPLE 2

One hundred and fifty (150) parts of dicyclopentadiene and 850 parts of cyclopentadiene-isoprene codimer were introduced into a 2-liter autoclave, reacted together at 260° C. for 7 hours in a nitrogen atmosphere to obtain a polymer solution and then distilling off the unreacted materials and low-grade polymers thereby to obtain a resin (3)-2.

COMPARATIVE SYNTHESIS EXAMPLE 3

Five hundred (500) parts of dicyclopentadiene, 250 parts of cyclopentadiene-isoprene codimer and 250 parts of cyclopentadiene-piperylene copolymer were charged into a 2-liter autoclave, reacted together at 260° C. for 5 hours and then removing the unreacted materials from the resulting reaction mixture thereby to obtain a resin (3)-3.

The resins obtained in the Comparative Synthesis Examples had the properties indicated in Table 1.

TABLE 1

|  |  |  |  | Synthesis Example | | | | | | Comparative Synthesis Example | | |
|---|---|---|---|---|---|---|---|---|---|---|---|---|
|  |  | Copolymer resin |  | 1 (1)-1 | 2 (1)-2 | 3 (1)-3 | 4 (1)-4 | 5 (1)-5 | 6 (1)-6 | 1 (3)-1 | 2 (3)-2 | 3 (3)-3 |
| Starting materials | Ingredient (A) | DCPD | (Parts) | 250 | 330 | 350 | 350 | 320 | 340 | 300 | 150 | 500 |
|  | Ingredient (B) | CPD-ISP codimer | (Parts) | 570 | 500 | 0 | 420 | 0 | 430 | 0 | 850 | 250 |
|  |  | CPD-PPL codimer | (Parts) | 180 | 140 | 0 | 230 | 0 | 100 | 0 | 0 | 250 |
|  |  | CPD-ISP-PPL cotrimer | (Parts) | 0 | 0 | 0 | 0 | 650 | 90 | 0 | 0 | 0 |
|  |  | ISP-PPL codimer | (Parts) | 0 | 0 | 650 | 0 | 0 | 0 | 0 | 0 | 0 |
|  |  | Others |  | 0 | 30 | 0 | 0 | 30 | 40 | 0 | 0 | 0 |
|  | Solvent | Xylene |  | 0 | 0 | 0 | 0 | 0 | 0 | 700 | 0 | 0 |
| Polymerizing conditions |  | Temp. (°C.) |  | 280 | 260 | 260 | 260 | 260 | 260 | 260 | 260 | 260 |
|  |  | Time (hr) |  | 5 | 5 | 5 | 5 | 1.5 | 5 | 2 | 7 | 5 |
| Properties of copolymer resin |  | Yield of resin (%) |  | 45.2 | 46.6 | 33.1 | 54.5 | 58.0 | 56.0 | 76.1 | 13.5 | 52.0 |
|  |  | Softening point (°C.) |  | 94.0 | 96.0 | 104.0 | 101.5 | 102.0 | 104.0 | 129.0 | 35.0 | 105.0 |
|  |  | Bromine value |  | 118 | 120 | 134 | 113 | 98 | 110 | 114 | 126 | 120 |

TABLE 1-continued

|  | Synthesis Example | | | | | | Comparative Synthesis Example | | |
|---|---|---|---|---|---|---|---|---|---|
| Copolymer resin | 1 (1)-1 | 2 (1)-2 | 3 (1)-3 | 4 (1)-4 | 5 (1)-5 | 6 (1)-6 | 1 (3)-1 | 2 (3)-2 | 3 (3)-3 |
| Color (Gardner) when melted | 6 | 5 | 11 | 8 | 8 | 8 | 10 | 8 | 8 |

(Note)
DCPD: Dicyclopentadiene
PPL: Piperylene
CPD: Cyclopentadiene
ISP: Isoprene
Others: Tetramers and high polymers obtained when CPD, ISP, PPL and the like are heat treated.

PREPARATION OF HYDROGENATED RESIN (2)

The resins ((1)-1 to (1)-6 and (3)-1 to (3)-3) obtained in Synthesis Examples 1–6 and Comparative Synthesis Examples were each hydrogenated under the operational conditions shown in Table 2 as particularized below.

One hundred (100) grams of each of these 9 resins, 100 g of methylcyclohexane as the solvent, and 3 g of a catalyst (Sulphur-resistant nickel N-113 produced by Nikki Chemical Co., Ltd.) were charged into a 500-ml autoclave provided with an agitator, subjected to hydrogenating reaction to obtain a reaction mixture which was cooled, withdrawn from the autoclave, filtered to remove the catalyst and then distilled to remove the solvent thereby to obtain hydrogenated resins (2)-1 to (2)-6 and (4)-1 to (4)-3.

TABLE 2

|  |  | Hydrogenated resin according to this invention | | | | | | Comparative hydrogenated resin | | |
|---|---|---|---|---|---|---|---|---|---|---|
| Hydrogenated resin | | (2)-1 | (2)-2 | (2)-3 | (2)-4 | (2)-5 | (2)-6 | (4)-1 | (4)-2 | (4)-3 |
| Starting copolymer resin used in hydrogenation | | (1)-1 | (1)-2 | (1)-3 | (1)-4 | (1)-5 | (1)-6 | (3)-1 | (3)-2 | (3)-3 |
| Hydrogenating conditions | Temp. (°C.) | 250 | 250 | 260 | 250 | 260 | 250 | 250 | 230 | 250 |
|  | Time (hr) | 3 | 3 | 5 | 3 | 5 | 3 | 3 | 3 | 3 |
|  | Pressure (Kg/cm$^2$ · G) | 70 | 70 | 70 | 70 | 50 | 50 | 50 | 70 | 50 |
| Properties of hydrogenated resin (2) | Softening point (°C.) | 98.0 | 100.0 | 100.0 | 108.0 | 106.0 | 101.0 | 132.0 | 33.0 | 103.0 |
|  | Bromine value | 4 | 4 | 3 | 4 | 5 | 5 | 5 | 4 | 4 |
|  | Color (Gardner) when melted | Not more than 1 | Not more than 1 | Not more than 1 | Not more than 1 | Not more than 1 | Not more than 1 | 1 | Not more than 1 | Not more than 1 |

EXAMPLES 1–6 AND COMPARATIVE EXAMPLES 1–3

(Preparation and properties of hot melt adhesive compositions)

Forty (40) parts of each of hydrogenated resins (2)-1 to (2)-6 and (4)-1 to (4)-3 obtained in the aforesaid Synthesis Examples and Comparative Synthesis Examples, 40 parts of an ethylene-vinyl acetate copolymer (produced under the trademark of EVA FLEX by Mitsui Polychemical Co., Ltd.), 20 parts of 145° F. paraffin wax and 0.5 parts of an antioxidant (2,6-di-tert.-butyl-p-cresol (DBPC)) were melted to form a homogeneous mixture, thereby obtaining hot melt adhesive compositions. The compositions so obtained were used and tested for their peel strength as an indicator of their bond strength. The test was made as follows:

Five (5) grams of each of the thus obtained adhesive compositions were inserted in between aluminum foils, 150 mm wide×200 mm long×0.2 mm thick each, and molded therein at 180° C. and 150 Kg/cm$^2$·G for 3 minutes to obtain test pieces, 25 mm wide×0.2 mm each, which were subjected to T type peel test in accordance with ASTM D1876-61T to measure Al/Al peel strength. The result is as indicated in Table 3.

TABLE 3

| Hydrogenated resin used | Example 1 (2)-1 | Example 2 (2)-2 | Example 3 (2)-3 | Example 4 (2)-4 | Example 5 (2)-5 | Example 6 (2)-6 | Comp. Example 1 (4)-1 | Comp. Example 2 (4)-2 | Comp. Example 3 (4)-3 |
|---|---|---|---|---|---|---|---|---|---|
| Al/Al peel strength | 1700 | 1650 | 1650 | 1200 | 1300 | 1500 | 700 | 600 | 850 |

As is seen from Table 3, the hot melt adhesive compositions (Examples 1–6) exhibited high peel strength. On the other hand, Comparative Example 1 indicated that the use of the hydrogenated resin (4)-1 prepared from the homopolymer of dicyclopentadiene resulted in not obtaining satisfactory bond strength, Comparative Example 2 showed that the use of the ingredient (B) in an excessive amount resulted in the production of the resin (3)-2 having an unduly low softening point and the use of its hydrogenated resin (4)-2 resulted in producing a hot melt adhesive composition having unsatisfactory bond strength, and Comparative Example 3 indicated that the use of the hydrogenated resin (4)-3 prepared by hydrogenating the resin (3)-3 using therein the ingredient (B) in an amount smaller than that specified in this invention, resulted in the production of a hot melt adhesive composition exhibiting unsatisfactory bond strength as compared with those (Examples 1–6) of this invention.

What is claimed is:
1. A hot melt adhesive composition comprising

(I) a hydrogenated resin (2) having a softening point of 60°–130° C. obtained by the hydrogenation of a copolymer resin (1) prepared by copolymerizing 20–38 parts by weight of at least one ingredient (A) selected from the group consisting of five-membered cyclic compounds having conjugated double bonds and the Diels-Alder's adducts thereof, the five-membered cyclic compounds being represented by the following general formula

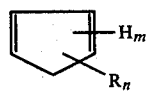

wherein H is hydrogen, R is an alkyl group having 1–3 carbon atoms, m and n are each zero or an integer of at least 1 with the proviso that the total of m and n is 6, with 80–62 parts by weight of at least one ingredient (B) selected from the group consisting of homodimers, codimers, homotrimers and cotrimers of at least one diene selected from the group consisting of said five-membered cyclic compounds, isoprene and piperylene, the dimers and trimers covered by the ingredient (A) being excluded, and (II) at least one member selected from the group consisting of copolymers of ethylene and a polar vinylic compound and waxes.

2. A hot melt adhesive composition according to claim 1, comprising 20–300 parts by weight of the hydrogenated resin (2) and at least one member selected from the group consisting of 100 parts by weight of the copolymers of ethylene and a polar vinylic compound and 10–400 parts by weight of the wax.

3. A hot melt adhesive composition according to claim 1 or 2, wherein the ingredient (A) is cyclopentadiene, methylcyclopentadiene, dicyclopentadiene, cyclopentadiene-methylcyclopentadiene codimer, tricyclopentadiene or a mixture thereof.

4. A hot melt adhesive composition according to claim 1 or 2, wherein the ingredient (B) is dimer or trimer of isoprene, dimer or trimer of piperylene, codimer or a cotrimer of isoprene and piperylene, codimer or a cotrimer of isoprene and cyclopentadiene, codimer or a cotrimer of piperylene and cyclopentadiene, cotrimer of isoprene, piperylene and cyclopentadiene, and a mixture thereof.

5. A hot melt adhesive composition according to claim 3, wherein the ingredient (B) is dimer or trimer of isoprene, dimer or trimer of piperylene, codimer or a cotrimer of isoprene and piperylene, codimer or a cotrimer of piperylene and cyclopentadiene, cotrimer of isoprene, piperylene and cyclopentadiene, and a mixture thereof.

6. A hot melt adhesive composition according to claim 1 or 2, wherein said copolymer II is a copolymer of ethylene and a polar vinylic compound selected from the group consisting of vinyl acetate, an acrylic acid ester or a methacrylic acid ester, and the wax is a petroleum wax, natural wax or synthetic wax.

7. A hot melt adhesive composition according to claim 3, wherein said copolymer II is a copolymer of ethylene and a polar vinylic compound selected from the group consisting of vinyl acetate, an acrylic acid ester or a methacrylic acid ester, and the wax is a petroleum wax, natural wax or synthetic wax.

8. A hot melt adhesive composition according to claim 4, wherein said copolymer II is a copolymer of ethylene and a polar vinylic compound selected from the group consisting of vinyl acetate, an acrylic acid ester or a methacrylic acid ester, and the wax is a petroleum wax, natural wax or synthetic wax.

9. A hot melt adhesive composition according to claim 5, wherein said copolymer II is a copolymer of ethylene and a polar vinylic compound selected from the group consisting of vinyl acetate, an acrylic acid ester or a methacrylic acid ester, and the wax is a petroleum wax, natural wax or synthetic wax.

10. A hot melt adhesive composition according to claim 9, wherein the petroleum wax is paraffin wax or microcrystalline wax, and the synthetic wax is polyethylene wax, polypropylene wax, Fisch-Tropsch wax or oxidized wax.

11. A hot melt adhesive composition consisting essentially of (I) a hydrogenated resin (2) having a softening point of 60°–120° C. obtained by the hydrogenation of a copolymer resin (1) prepared by copolymerizing 20–38 parts by weight of at least one ingredient (A) selected from the group consisting of five-membered cyclic compounds having conjugated double bonds and the Diels-Alder's adducts thereof, the five-membered cyclic compounds being represented by the following general formula

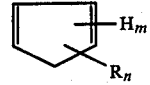

wherein H is hydrogen, R is an alkyl group having 1–3 carbon atoms, m and n are each zero or an integer of at least 1 with the proviso that the total of m and n is 6, with 80–62 parts by weight of at least one ingredient (B) selected from the group consisting of homodimers, codimers, homotrimers and cotrimers of at least one diene selected from the group consisting of said five-membered cyclic compounds, isoprene and piperylene, the dimers and trimers covered by the ingredient (A) being excluded, and (II) at least one member selected from the group consisting of copolymers of ethylene and a polar vinylic compound and waxes.

* * * * *